(12) United States Patent
Saito et al.

(10) Patent No.: US 6,757,346 B2
(45) Date of Patent: Jun. 29, 2004

(54) CODE DIVISION MULTIPLEX RADIO EQUIPMENT WITH INTERFERENCE CANCELER

(75) Inventors: Tamio Saito, Beijing (CN); Morihiko Minowa, Kawasaki (JP); Yoshihiko Asano, Kawasaki (JP); Tadashi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/975,463

(22) Filed: Oct. 5, 2001

(65) Prior Publication Data

US 2002/0041645 A1 Apr. 11, 2002

Related U.S. Application Data

(63) Continuation of application No. PCT/JP99/02323, filed on Apr. 30, 1999.

(51) Int. Cl.[7] .................................................. H04B 1/10
(52) U.S. Cl. ........................ 375/349; 375/346; 375/285; 455/296
(58) Field of Search ................................. 375/346, 202, 375/349, 347, 285, 267; 370/342; 455/501, 296

(56) References Cited

U.S. PATENT DOCUMENTS

| | | | | |
|---|---|---|---|---|
| 4,470,138 A | * | 9/1984 | Gutleber ..................... | 370/342 |
| 5,394,434 A | * | 2/1995 | Kawabe et al. ............. | 375/205 |
| 5,781,542 A | * | 7/1998 | Tanaka et al. .............. | 370/342 |
| 5,966,377 A | * | 10/1999 | Murai ......................... | 370/342 |
| 6,002,727 A | * | 12/1999 | Uesugi ........................ | 375/346 |
| 6,052,602 A | * | 4/2000 | Yamamoto ................... | 455/525 |
| 6,081,516 A | * | 6/2000 | Yoshida et al. ............. | 370/342 |

FOREIGN PATENT DOCUMENTS

| | | |
|---|---|---|
| EP | 0 606 546 | 7/1994 |
| EP | 0 776 105 | 5/1997 |
| EP | 0 823 796 | 2/1998 |
| JP | 09200179 | 7/1997 |
| JP | 09270766 | 10/1997 |
| JP | 10126313 | 5/1998 |
| JP | 10190495 | 7/1998 |
| WO | 96/38967 | 12/1996 |

* cited by examiner

*Primary Examiner*—Phoung Phu
(74) *Attorney, Agent, or Firm*—Katten Muchin Zavis Rosenman

(57) ABSTRACT

When an antenna receives a signal, the signal is inputted to delayers through a frequency converter, A/D converters, quadrature demodulators, filters and simultaneously is inputted to a MUX. The receiving signal inputted to the MUX is transmitted to an interference canceler panel, and the interference canceler panel generates both an interference replica signal and a symbol replica signal. The interference canceler panel demodulates the receiving signal for a channel corresponding to the symbol replica signal using both the interference and symbol replica signals. The interference replica signal generated by the interference canceler panel is transmitted to a transmitting/receiving panel and is inputted to interference elimination units. The interference elimination units eliminates interference components by subtracting the interference replica signal from the receiving signal delayed by the delayers and transmits the signal to a baseband signal processing panel.

10 Claims, 8 Drawing Sheets

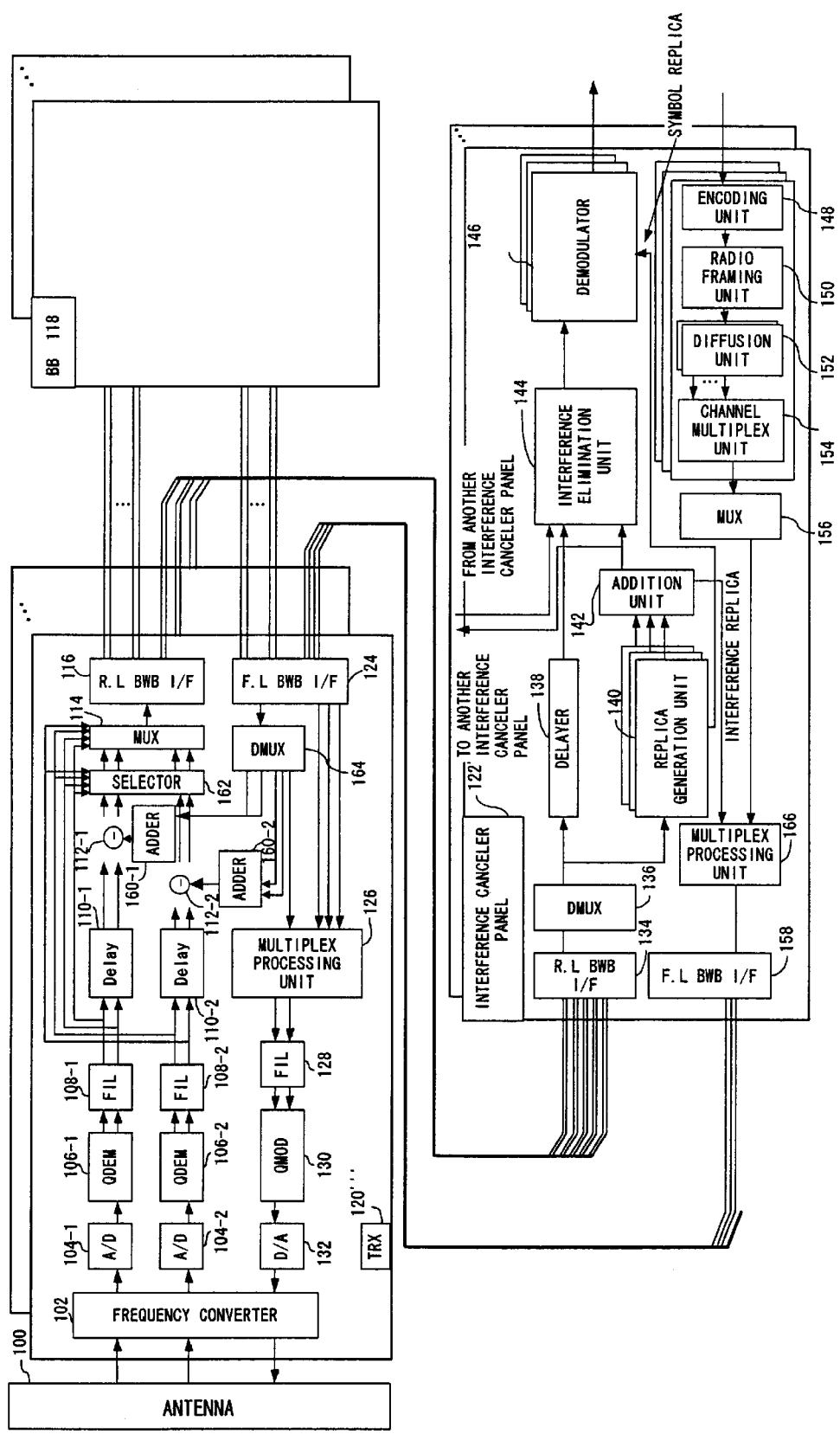
F I G. 8

CODE DIVISION MULTIPLEX RADIO EQUIPMENT WITH INTERFERENCE CANCELER

CROSS REFERENCE TO RELATED APPLICATION

This application is a continuation of international application Number PCT JP99/02323, filed Apr. 30, 1999. (status, abandoned, pending, etc.).

This application is a continuation of international PCT application No. PCT/JP99/02323 filed on Apr. 30, 1999.

BACKGROUND OF THE INVENTION

1. Field of the Invention

The present invention relates to code division multiplex radio equipment with an interference canceler.

2. Description of the Related Art

As a next-generation digital mobile communications method, a radio access method using a code division multiple access (CDMA) method is being examined and put into practical use. The CDMA method is a multiple access method using a spectrum diffusion communications method. In the CDMA method, a plurality of channels or user's transmission data are multiplexed by a code and are transmitted through a transmission line, such as a radio circuit and the like. The CDMA method is an interference restriction type system where system capacity is restricted by interference due to the incomplete orthogonality of a code between users, and an interference elimination technology is useful for the increase of system capacity.

FIG. 1 shows the basic configuration of a multi-stage type parallel interference canceler.

The interference canceler shown in FIG. 1 is particularly applied to a base station in a CDMA communications system. Receiving signals are transmitted to interference replica generation units 1a-1 to 1a-n provided for each user. The interference replica generation units 1a-1 to 1a-n generate both the interference replica signal and symbol replica signal of the signal received from each user. The receiving signal is inputted to a delayer 2a, is delayed by a time required for the interference replica generation units 1a-1 to 1a-n to generate both the interference replica signal and symbol replica signal, and is inputted to an interference elimination unit 3a. The interference elimination unit 3a eliminates interference components by subtracting the interference replica signals transmitted from each interference replica generation units 1a-1 to 1a-n from the receiving signal that passes through the delayer 2a in the interference elimination unit 3a. Since the interference replica generation units 1a-1 to 1a-n are provided in relation to each of all users that are accommodated in a base station, the interference elimination unit 3a obtains a signal by eliminating all signals transmitted by each user from the receiving signal as interference components.

This process is performed in several stages (two stages in FIG. 1). Specifically, the signal obtained by the interference elimination unit 3a are further inputted to each of the interference replica generation units 1b-1 to 1b-n, and an interference signal component corresponding to each user is extracted from the signal outputted from the interference elimination unit 3a. The signal outputted from the interference elimination unit 3a is inputted to a delayer 2b, is delayed by a time required for the interference replica generation units 1b-1 to 1b-n to generate both the interference replica signal and symbol replica signal and is inputted to an interference elimination unit 3b. The interference elimination unit 3b eliminates the interference replica signals outputted from the interference replica generation units 1b-1 to 1b-n from the signal from the delayer 2b. The interference replica generation units 1a-1 to 1a-n generate a symbol replica signal and input it to corresponding interference replica generation units 1b-1 to 1b-n in a subsequent stage. A symbol replica signal from a previous stage is inputted to the interference replica generation units 1b-1 to 1b-n, and a new symbol replica signal is generated by combining the symbol replica signal from a previous stage with the signal from each user that is extracted from the signal from the interference elimination unit 3a. Thus the generated symbol replica signal is inputted to receivers 4-1 to 4-n provided for each user. Furthermore, the signal from the interference elimination unit 3b is also inputted to each of the receivers 4-1 to 4-n, and each of the receivers 4-1 to 4-n demodulates and receives the signal transmitted from each user.

The configuration of the interference canceler shown in FIG. 1 is for a base station and a receiver receives both the interference replica signal obtained by eliminating all receiving signals from each user as interference components and the symbol replica signal obtained by demodulating a signal from each user. Theoretically, it is all right if signals other than a signal from a target user are eliminated and the user signal is demodulated from the remaining signal after interference elimination. However, since in a base station, signals from all users must be received, the configuration becomes very lengthy if a circuit is configured based on the principle described above. Therefore, the system is configured so that both an interference replica signal obtained by eliminating all signals from all users from a receiving signal and a symbol replica signal, which is the demodulation signal of a receiving signal from each user can be received. It is also all right if only the symbol replica signal, which is the demodulation signal of a receiving signal from each user, is received. However, in that case, when an interference replica signal is generated, in reality the interference replica signal gains slight power due to fading and the like, and becomes a definite signal, although the power of the interference replica signal is ideally "0". The circuit shown in FIG. 1 is configured utilizing the fact that a receiving characteristic is improved if this interference replica signal is used to demodulate a user signal along with a symbol replica signal.

FIG. 2 shows the configuration of the interference replica generation unit shown in FIG. 1.

The interference replica generation unit is provided with a plurality of fingers to perform RAKE-combination. Each finger includes an inverse diffusion unit 5 and a channel estimation unit 6. A receiving signal is inputted to a searcher 12. The searcher 12 extracts a timing signal for multiplying the receiving signal by an inverse diffusion code, and, the inverse diffusion unit 5 demodulates the receiving signal based on this timing. After the channel estimation unit 6 estimates the channel of the demodulated signal, a combination unit 7 combines the demodulated signal for each finger at a maximum ratio and inputs the signal to a judgment unit 8. After being temporarily judged in the judgment unit 8, the receiving signal is branched into the same number of signals as the number of the fingers. The branched receiving signals after the temporary judgment are inputted to the same number of delay restoration units 9 as the number of the fingers. The timing signal detected by the searcher 12 is inputted to the delay restoration units 9, and each of the delay restoration units 9 provides a delay to the branched signal. Thus, a signal delay corresponding to each multi-path possessed when the receiving signal is inputted to the finger, is restored. A re-diffusion unit 10 restores the signal after the temporary judgment, to which a delay is given, to a diffusion/modulation signal. A combination unit 11 combines the re-diffusion signals from each finger into an interference replica signal. The output signal of each delay restoration unit 9 is transmitted to an interference replica generation unit in a subsequent stage or a receiver as a symbol replica signal.

FIG. 3 shows the configuration in the case where an interference canceler is not introduced in radio base-station equipment.

The flow of a receiving signal is as follows. First, when an antenna 20 receives a signal, the frequency converter 22 of a transmitting/receiving panel 21 converts the receiving signal from an RF frequency to a baseband frequency. Then, A/D converters 24-1 and 24-2 convert the receiving signal from an analog signal to a digital signal. Quadrature demodulators 26-1 and 26-2 quadrature-demodulate this digital signal, and generate both an I signal and a Q signal. Filters 28-1 and 28-2 restrict the bands of the quadrature-demodulated I and Q signals. Although in this case, the A/D converter 24, quadrature-demodulator 26, and filter 28 are duplicated, this is because diversity reception using two antennae 20 is assumed. The band-restricted signal after the quadrature demodulation consists of I and Q signals for two branches. After a multiplexer 30 multiplexes the I and Q signals, the signal is transmitted to a baseband signal processing panel 50 through both a backboard interface 32 and a backboard 52. The baseband signal processing panel 50 receives the signal transmitted from the transmitting/receiving panel 21 through a baseband signal interface 52 and a demultiplexer 54 demultiplexes the receiving signal into I and Q signals for two branches corresponding to two antennae 20. Although a transmitting/receiving unit and a baseband signal-processing unit are called a transmitting/receiving panel 21 and a baseband signal-processing panel 50, respectively, this is because the transmitting/receiving unit and the baseband signal processing unit are both composed of one or more boards. The receiving signal that has been demultiplexed into the I and Q signals of each branch by the demultiplexer 54, is inputted to a searcher 60 for each branch, and the searcher 60 extracts a path delay timing signal. An inverse diffusion unit 56 uses this timing signal for inverse diffusion. After the inverse diffusion unit 56 inversely diffuses the receiving signal, a synchronous detector 58 synchronously detects the receiving signal, and a RAKE combination unit 62 performs RAKE COMBINATION FOR THE RECEIVING SIGNAL. After an error correction unit 64 corrects the error of the RAKE-combined signal, the RAKE-combined signal is outputted as receiving data.

The flow of a transmitting signal is as follows. An encoding unit 66 performs error correction encoding for inputted data, a radio-framing unit 68 generates a radio frame and both a pilot signal and a power control bit are added to the frame. Then, a diffusion unit 70 diffuses/modulates the inputted data, and a channel multiplex unit 72 multiplexes a plurality of channels that are outputted from a plurality of the diffusion units 70 provided in the baseband signal processing panel 50. In this preferred embodiment, since a W-CDMA system is assumed and one user uses a plurality of channels, a modulation unit for one user (comprising an encoding unit 66, a radio framing unit 68 and a diffusion unit 70) outputs diffusion/modulation signals for a plurality of channels. Then, a MUX 74 multiplexes diffusion/modulation signals for all users provided in the baseband signal processing panel 50, and a transmitting signal is outputted to a backbone wiring through a down backboard interface 76. A transmitting panel 21 receives the transmitted signal through a down backboard signal interface 34. Although one transmitting panel 21 is provided for one transmitting/receiving frequency, a plurality of baseband signal processing panels 50 are provided depending on the number of accommodated users. Therefore, if a plurality of user transmitting signals from a plurality of baseband signal processing panels 50 use one frequency, for example, a plurality of transmitting signals are transmitted to one transmitting/receiving panel 21 from a plurality of baseband signal processing panels 50. Therefore, the transmitting/receiving panel 21 inputs signals received from a plurality of baseband processing panels 50 to a multiplex processing unit 36 using a down backboard signal interface 34, multiplexes the transmitting signals from the plurality of baseband signal processing panels 50 into a plurality of pairs of I and Q signals. After a filter 38 restricts the bands of the I and Q signals multiplexed in this way, a quadrature modulator 40 quadrature-modulates the I and Q signals. Then, an D/A converter 42 converts the I and Q signals into analog signals, a frequency converter 22 converts the analog signals into RF-band signals, and an antenna 20 transmits the RF-band signals.

FIG. 4 shows the conventional configuration in the case where radio base-station equipment is provided with an interference canceler.

In FIG. 4, the same constituent components as described in FIGS. 1 through 3 are denoted by the same reference numbers.

The flow of a receiving signal is as follows. First, when an antenna 20 receives a signal, the frequency converter 22 of a transmitting/receiving panel 21 converts the receiving signal from an RF frequency to a baseband frequency. Then, A/D converters 24-1 and 24-2 convert the receiving signal from an analog signal into a digital signal. Quadrature demodulators 26-1 and 26-2 quadrature-demodulate this digital signal and generate both an I signal and a Q signal. Then, filters 28-1 and 28-2 restrict the bands of the quadrature-demodulated I and Q signals. Although in this case, the A/D converter 24, quadrature-demodulator 26, and filter 28 are duplicated, this is because diversity reception using two antennae 20 is assumed. After a multiplexer 30 multiplexes the I and Q signals, the signals are transmitted to an interference elimination circuit 78 through both a backboard interface 32 and a backboard wiring. The interference elimination circuit 78 receives the signal transmitted from the transmitting/receiving panel 21 through a backboard signal interface 80, and a demultiplexer 82 demultiplexes the receiving signal into I and Q signals for each branch. The I and Q signals demultiplexed in this way are inputted to an interference replica/symbol replica generation units 83-1 and 83-2 provided for each branch and then are inputted to a searcher 12. The searcher 60 extracts the timing signal of a delay wave due to multi-paths against one channel. This timing signal is transmitted to the inverse diffusion unit 5 of each finger, and the inverse diffusion unit 5 inversely diffuses and demodulates the receiving signal of one channel. After a channel estimation unit 6 estimates the channel of the inversely-diffused/demodulated receiving signal, a combination unit 7 combines the signals of each finger at a maximum ratio and the signals are inputted to a judgment unit 8. After the judgment unit 8 temporarily judges the receiving signal, the receiving signal is branched again into the same number of signals as that of fingers and a delay restoration unit 9 restores the delay possessed before the combination unit 7 performs RAKE-combination for the receiving signal, based on the timing signal extracted by the searcher 12. Then, a re-diffusion unit 10 restores the receiving signal to the diffusion/modulation signal. A combination unit 11 combines the re-diffusion signals from each finger. Furthermore, an addition unit 84 sums a plurality of channels of the signals combined for each channel by the combination unit 11, and inputs the summed signal to an interference elimination unit 3 as an interference replica signal.

The output signal of the delay restoration unit 9 is transmitted to a baseband signal processing panel 50 through the interference replica generation unit in a subsequent stage, which is not shown in FIG. 4 or a backboard interface 86. The interference elimination unit 3 divides the receiving signal delayed by a delayer 2 by a process time required to generate an interference replica signal, by the combined interference replica signal. Thus, interference components can be eliminated from the receiving signal. The interference-eliminated receiving signal is transmitted to the baseband signal processing panel 50 through a backboard interface 86. In the baseband signal processing panel 50, a backboard interface 52 receives both the interference-eliminated signal transmitted from an interference elimination circuit 78 and a symbol replica signal, and a DMUX 54 demultiplexes the signals into the I and Q signals for each branch. After inversely diffusing the interference-eliminated receiving signal in the timing obtained by a searcher 60, an inverse diffusion unit 56 combines the receiving signal with a symbol replica signal transmitted from the interference elimination circuit 78, and a synchronous detection unit 58 synchronously detects the combined signal. Then, a RAKE-combination unit 62 performs RAKE-combination for the signal. After correcting the error of the RAKE-combined signal, an error correction unit 64 outputs the signals as receiving data.

Since the flow of a down signal is the same as that in the conventional configuration where an interference canceler is not introduced, the description is omitted.

As described above, if an interference canceler is introduced into base-station equipment into which an interference canceler is not introduced due to the conventional technology, the interference canceler is to be introduced between a transmitting/receiving panel and a baseband signal processing panel, and thereby there is no need for a backboard for connecting a transmitting/receiving panel with a baseband signal processing panel. However, if an interference canceler panel is installed in advance and an interference canceler is not provided, signals simply pass through this interference canceler panel and thereby the mounting density of an entire apparatus is reduced, which is a problem.

SUMMARY OF THE INVENTION

It is an object of the present invention to provide radio equipment for solving the problem of the prior art described above, requiring no modification of a backboard or minimizing the extension of a signal wire when an interference canceler is introduced and introducing the interference canceler without the great reduction of the channel mounting density of radio base-station equipment.

The radio equipment in the first aspect of the present invention adopts a code division multiple access method. The radio equipment comprises a transmitting/receiving panel for receiving signals from an antenna, outputting the receiving signals after performing a prescribed process for the receiving signal and simultaneously delaying the receiving signal by a prescribed time, a removable baseband signal processing panel for demodulating data by inversely diffusing/demodulating the receiving signal transmitted from the transmitting/receiving panel and a removable interference canceler panel for generating an interference replica signal to be used to eliminate interference components included in the receiving signal, based on the signal received from the transmitting/receiving panel and returning the interference replica signal to the transmitting/receiving panel. The transmitting/receiving panel eliminates interference components by subtracting the interference replica signal transmitted from the interference canceler panel from the delayed receiving signal, inputs the receiving signal after the interference elimination to the baseband signal processing panel and enables the baseband signal processing panel to demodulate data based on the receiving signal after the interference elimination.

The radio equipment in the second aspect of the present invention adopts a code division multiple access method. The radio equipment comprises transmitting/receiving unit for receiving signals from an antenna, outputting the receiving signals after performing a prescribed process for the receiving signal and simultaneously delaying the receiving signal by a prescribed time, removable baseband signal processing unit for demodulating data by inversely diffusing/demodulating the receiving signal transmitted from the transmitting/receiving unit and removable interference canceler unit for generating an interference replica signal to be used to eliminate interference components included in the receiving signal based on the signal received from the transmitting/receiving unit and returning the interference replica signal to the transmitting/receiving unit. The transmitting/receiving unit eliminates interference components by subtracting the interference replica signal transmitted from the interference canceler unit from the delayed receiving signal, inputs the receiving signal after the interference elimination to the baseband signal processing unit and enables the baseband signal processing unit to demodulate data based on the receiving signal after the interference elimination.

The signal processing method of the radio equipment of the present invention adopts a code division multiple access. The signal processing method comprises (a) receiving a signal from an antenna, outputting the receiving signal after performing a prescribed process for the receiving signal and simultaneously delaying the receiving signal by a prescribed time in a transmitting/receiving panel, (b) demodulating data by inversely diffusing/demodulating the receiving signal transmitted from the transmitting/receiving panel in a removable baseband signal processing panel and (c) generating an interference replica signal to be used to eliminate interference components included in the receiving signal based on the signal received from the transmitting/receiving panel and returning the interference replica signal to the transmitting/receiving panel. In the transmitting/receiving panel, by subtracting the interference replica signal transmitted from the interference canceler unit from the delayed receiving signal in step (c), interference components are eliminated and data are demodulated based on the receiving signal after the interference elimination in step (b).

According to the present invention, since a transmitting/receiving panel eliminates interference components using an interference replica signal, the number of wires in an interface between a transmitting/receiving panel and an interference canceler panel, and the number of wires of an interference between a transmitting/receiving panel and a baseband signal processing panel can be made the same or almost the same. Therefore, by installing a board with an interference canceler in a prescribe position as occasion arises, an interference elimination function (interference canceler) can be easily introduced without the increase or modification of wiring.

In the equipment in the second aspect of the present invention, transmitting/receiving unit, baseband signal processing unit and interference canceler unit can also be composed of a plurality of boards, and the number of boards of each of them is not limited to one.

BRIEF DESCRIPTION OF THE DRAWINGS

FIG. 8 shows the configuration of the fourth preferred embodiment of the present invention.

DESCRIPTION OF THE PREFERRED EMBODIMENTS

Figure 1:
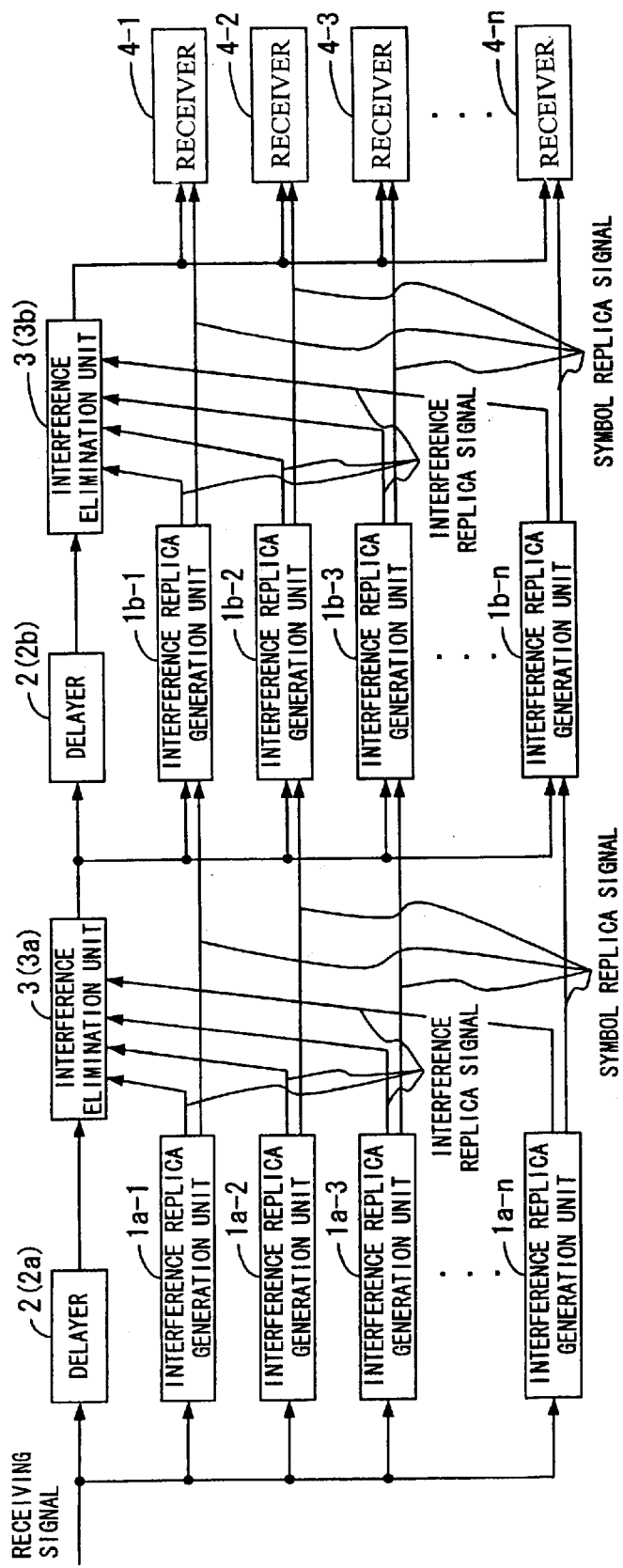
FIG. 1 shows the basic configuration of a multi-stage type parallel interference canceler.

In the present invention, the flow of a receiving signal to a baseband signal processing unit (BB) is equalized to conventional radio base-station equipment by transmitting an interference replica signal generated by the interference replica generation unit in an interference canceler, eliminating interference elements in a transmitting/receiving panel and transmitting the interference-eliminated signal to each baseband signal processing unit. A receiving signal output interface from an interference canceler panel is equal to a conventional baseband processing unit by eliminating interference components in an interference replica panel too using each interference replica signal and installing the baseband signal processing unit in an interference canceler panel.

In another preferred embodiment, the interface of a interference replica signal transmitted from an interference replica panel to a transmitting/receiving panel is equal to a conventional baseband signal processing panel without providing a new signal wire to transmit the interference replica signal, by multiplexing the interference replica signal with a down signal and transmitting it.

Furthermore, if interference cancelers are installed in a plurality of substrates, both interference elimination and user-data demodulation are performed by transmitting an interference replica signal generated in each substrate between the substrates with an interference canceler and summing all replica signals for each substrate. Simultaneously, after interference components are eliminated by transmitting the interference replica signals that are summed for each substrate secluded from the other substrates, to a transmitting/receiving panel and summing the signals by an adder provided in the transmitting/receiving panel. Thus, even if interference cancelers are installed in a plurality of substrates, almost the same interface as that used in the case of one substrate can be provided.

Furthermore, in order to prevent a delay equivalent to the process of an interference canceler panel from being added if an interference canceler is not installed in a transmitting/receiving panel, in a transmitting/receiving panel a line for bypassing a delayer is provided and a selector is provided in advance for switching a case where an interference elimination function is provided and a case where the interference elimination function is not provided.

By such a configuration, a transmitting/receiving panel, a baseband signal processing panel and the interface of a baseband signal processing panel with an interference canceler are completely or almost completely equal between the case where an interference elimination function is provided and the case where the interference elimination function is not provided, and an interference canceler can be added later without the modification of a backboard.

According to the installation method of this preferred embodiment, by transmitting an interference replica signal to a transmitting/receiving panel, eliminating interference components in the transmitting/receiving panel and transmitting the interference-eliminated signal to each baseband signal processing panel, a normal transmitting/receiving panel and a baseband signal processing panel can be connected even if an interference canceler is not introduced. If an interference canceler is introduced, the interference-eliminated signal can be transmitted through the connection between a normal transmitting/receiving panel and a baseband signal processing panel, and an interference canceler can be introduced without modifying the wiring of a backboard before and after the interference canceler is introduced. By multiplexing an interference replica signal generated by the interference replica generation unit of an interference canceler panel with a down signal and transmitting it, a new signal wire does not need to be provided to transmit the interference replica signal. Furthermore, by installing a baseband signal processing unit on the same substrate, both the interference replica signal and timing signal that are generated by the interference replica generation unit do not need to be transmitted out of the substrate, the input/output interface of an interference canceler panel becomes the same as that of the conventional baseband signal processing panel and by using a baseband signal processing panel with an interference canceler in radio base-station equipment, an interference canceler can be introduced without the modification of a backboard.

If interference cancelers are installed in a plurality of substrates, by providing an adder for adding interference replica signals from each installation canceler in a transmitting/receiving panel, variations in a delay time due to difference in the number of substrates do not need to be worried about, and simultaneously the same interface as that used in the case where one interference canceler is provided, can be used.

Figure 5:
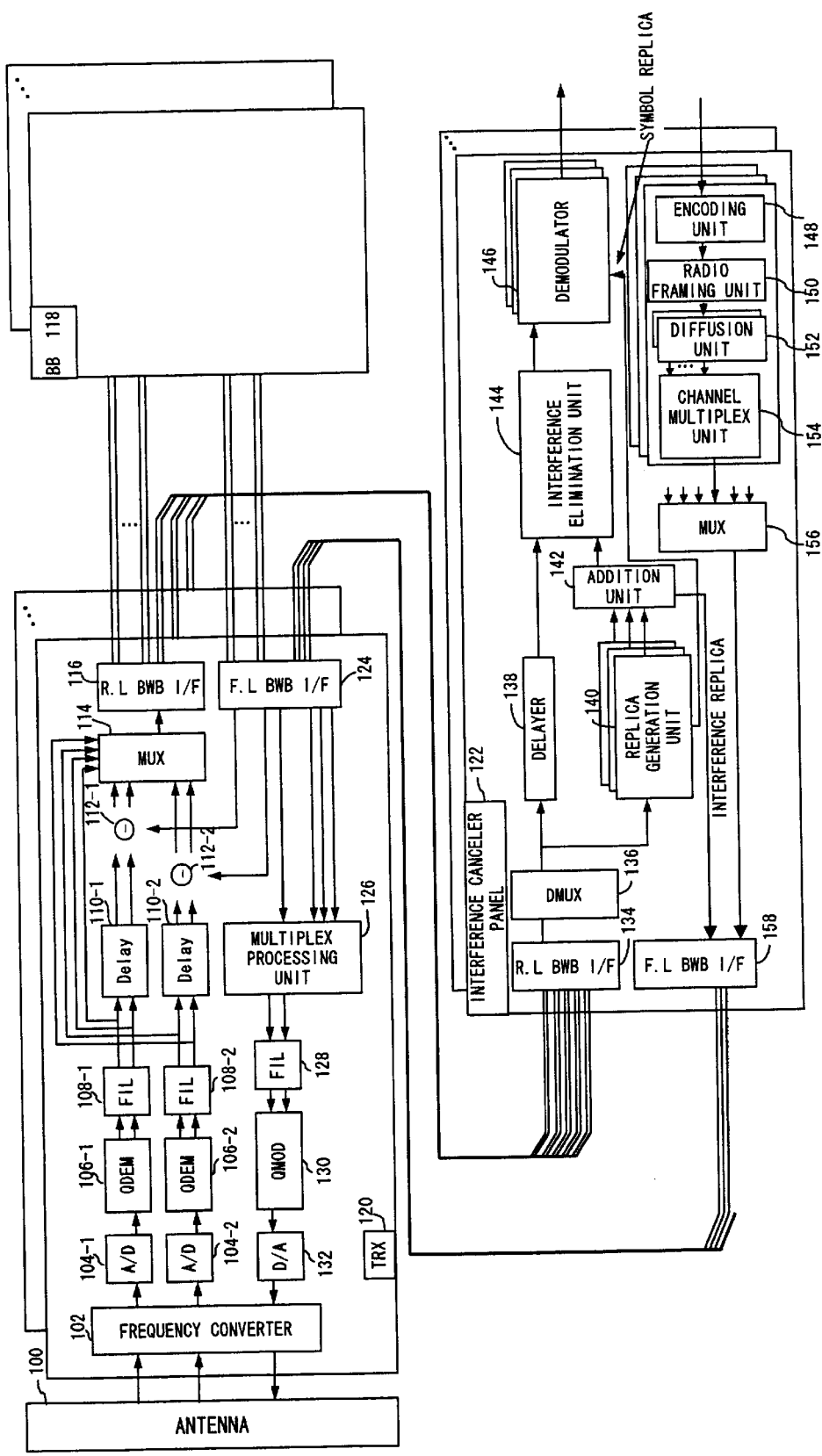
FIG. 5 shows the configuration of the first preferred embodiment of the present invention.

FIG. 5 shows the configuration of the first preferred embodiment of the present invention.

The radio base-station equipment of the first preferred embodiment largely comprises a transmitting/receiving panel 120 (TRX), an interference canceler panel 122 and a baseband signal processing panel 118 (BB). Each of these panels is composed of one or a plurality of boards, and each of them is removable depending on the requirements of a radio base station, as requested. In particular, the interference canceler panel 122 and baseband signal-processing panel 118 can be replaced with each other. Specifically, if interference components are eliminated in a channel processed by the relevant board, the interference canceler panel 122 is used. If interference components are not eliminated, the baseband signal-processing panel 118 is used to process the relevant channel. In each of the preferred embodiments described below, a configuration in which a board can be replaced is applied.

The receiving system of the transmitting/receiving panel 120 includes a frequency converter 102, A/D converters 104-1 and 104-2, quadrature demodulators 106-1 and 106-2 (QDEM), filters 108-1 and 108-2 (FIL), delayers 110-1 and 110-2 (Delay), interference elimination units 112-1 and 112-2 (subtracter unit in FIG. 5), an MUX 114 and an up backboard signal interface 116 (R.L. BWB I/F). The A/D converter 104, quadrature demodulator 106, filter 108, delayer 110 and interference elimination unit 112 are duplicated (two systems or two branches). The transmitting system of each transmitting/receiving panel 120 includes a down backboard signal interface 124 (F.L. BWB I/F), a multiplex processing unit 126, a filter 128 (FIL), a quadrature modulator 130 (QMOD), a D/A converter 132 and a frequency converter 102. The receiving system of each interference canceler panel 122 includes an up backboard signal interface 134 (R.L. BWB I/F), a DMUD 136, a delayer 138, an interference replica generation 140, an addition unit 142, an interference elimination unit 144 and a demodulator 146. The transmitting system of the interference canceler panel 122 includes an encoding unit 148, a radio framing unit 150, a diffusion unit 152, a channel multiplex unit 154, a MUX 156 and a down backboard signal interface 158 (R.L. BWB I/F). Since the baseband signal-processing unit 118 (BB) has the same configuration as the baseband signal-processing unit 50, the configuration is omitted.

Figure 2:
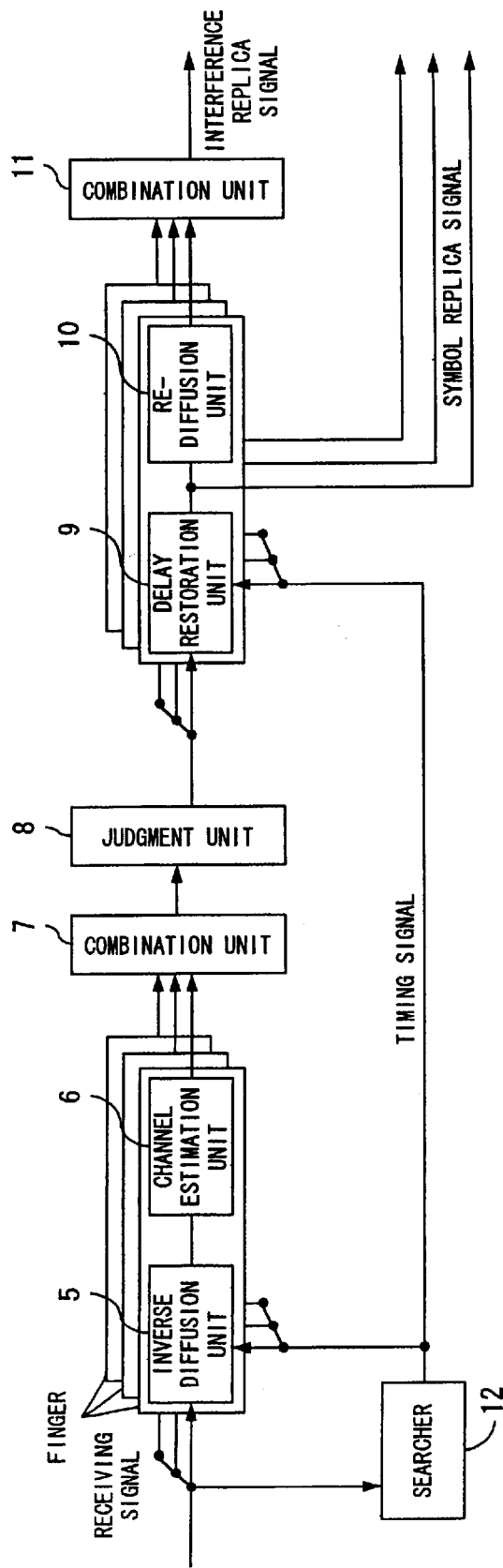
FIG. 2 shows the configuration of the interference replica generation unit shown in FIG. 1.

The flow of a receiving signal is as follows. First, when an antenna 100 receives a signal, the frequency converter 102 of the transmitting/receiving panel 120 converts the signal from a RF signal to a baseband frequency signal, the signal is inputted to the A/D converters 104-1 and 104-2 and the A/D converters 104-1 and 104-2 converts the signal from an analog signal to a digital signal. The quadrature demodulators 106-1 and 106-2 quadrature-demodulate this digital signal, and the filters 108-1 and 108-2 restricts the band of the demodulated signal. Then, the band-restricted signal is transmitted to the MUX 114 and the MUX 114 multiplexes I and Q signals for two branches. In this preferred embodiment, diversity reception by two antennae is assumed. In this case, the I and Q signals for two branches can also be transmitted without multiplexing. In that case, there is no need for a MUX 114. Alternatively, a signal to be transmitted can be selected by a selector, and the MUX 114 can multiplex it. Then, the signal is transmitted from the up backboard signal interface 116 to the interference canceler panel 122 through a backboard. The interference canceler panel 122 receives the signal transmitted from the transmitting/receiving panel 120 through the up backboard signal interface 134, and the DMUX 136 demultiplexes it into I and Q signals for two branches. In this case, if the transmitting/receiving panel 120 does not multiplex the signals, there is no need for a DMUX 136. One pair of demultiplexed receiving signals are transmitted to the delayer 138 and the other pair is transmitted to the interference replica generation unit 140. In the interference replica generation unit 140 with the same configuration as that shown in FIG. 2, where one pair of I and Q signal are omitted, the receiving signals are inputted to a searcher, which is omitted in FIG. 5, and the searcher extracts the timing signal of the inputted delay wave. This timing signal is transmitted to the inverse diffusion unit, which is not shown in FIG. 5, of each finger, and the inverse diffusion unit demodulates the receiving signal. A channel estimation unit, which is not shown in FIG. 5, estimates the channel of the demodulated signal, a combination unit, which is not shown in FIG. 5, combines the signals for each finger at a maximum ratio and inputs the signals to a judgment unit, which is not shown in FIG. 5. After the judgment unit temporarily judges the receiving signal, the signal is divided for each finger again, a delay restoration unit, which is not shown in FIG. 5, restores the delay before the RAKE combination is performed for the signal, and a re-diffusion unit, which is not shown in FIG. 5, restores the signal to the diffusion/modulation signal. The re-diffusion signal is transmitted to each replica generation unit 140 and then is transmitted to the addition unit 142. The addition unit 142 combines the re-diffusion signals from the respective replica generation unit 140 provided for each channel, into an interference replica signal. The output signal of the judgment unit, which is not shown in FIG. 5, the adder 142 is transmitted to an interference replica generation unit in a subsequent stage or the demodulation unit 146 as a symbol replica signal. Interference components are eliminated by subtracting the combined interference replica signal from the receiving signal that the delayer 18 delays by a process time required to generate an interference replica signal. The interference-eliminated receiving signal is transmitted to the demodulation unit 146 provided for each user in the interference canceler panel 122, and the demodulation unit 146 demodulates the user data processed by an interference canceler. After inversely diffusing the interference-eliminated receiving signal, the demodulation unit 146 combines the inversely-diffused receiving signal with the symbol replica signal transmitted from the replica generation unit 140, synchronously detects and performs RAKE combination. An error correction unit, which is not shown in FIG. 5, corrects the error of the RAKE-combined signal and outputs it as receiving data. The output data have the same interface as that of the output data of the conventional baseband signal processing panel 118 (BB) without any interference canceler.

The interference replica signal added by the addition unit 142 is transmitted to the transmitting/receiving panel 120 again through the down backboard interface 158. The transmitting/receiving panel 120 eliminates interference elements by subtracting the received interference replica signal from the receiving signal that the delayers 110-1 and 110-2 delay by a time required to generate and to transmit the interference replica signal of the receiving signal, transmits the interference-eliminated receiving signal to the baseband signal processing unit 118 (BB) using the conventional backboard wiring and demodulates the interference-eliminated signal. The interference elimination units 112-1 and 112-2 are composed of subtracters, and subtracts all interference replica signals transmitted from a plurality of interference canceler panel 122 from the receiving signal outputted from the delayers 110-1 and 110-2.

The flow of a transmitting signal is as follows. When a data signal is inputted to the encoding unit 148, the encoding unit performs error correction encoding, and the radio framing unit 150 forms the signal into a radio frame. Then, the diffusion unit 152 diffuses/modulates the form, and the channel multiplex unit 154 multiplexes the diffused/modulated signals for each channel. Then, the channel-multiplexed signal is inputted to the MUX 156. A plurality of the encoding units 148, radio frame units 150, diffusion units 152 and channel multiplex units 154 are provided for each user. Therefore, the MUX 156 further multiplexes a plurality of channel multiplex signals generated for each user and transmits them from the backboard interface 158 to the transmitting/receiving panel 120. In the transmitting/receiving panel 120, the backboard interface 124 receives the signal and inputs it to the multiplex-processing unit 126. The multiplex processing unit 126 multiplexes signals transmitted from a plurality of interference canceler panels 122 and baseband signal processing units 118, and inputs them to the filter 128. The filter 128 restricts the band of the signal, and the quadrature modulator 130 quadrature-modulates the signal. Then, the D/A converter 132 converts the quadrature-modulated signal from a digital signal to an analog signal, the frequency converter 102 converts the frequency of the signal from a baseband band to an RF band and the antenna 100 transmits the signal.

According to this preferred embodiment, the baseband signal processing panel 118 and interference canceler panel 122 are almost the same except for that only the interference canceler panel 122 requires a signal wire for transmitting an interference replica signal. Therefore, it is sufficient if the same number of signal wires to be installed to transmit an interference replica signal as the number of the interference canceler panel 122 are provided. Therefore, there is almost no need to increase or modify the number of the wires of a backboard regardless of whether an interference canceler panel 122 is installed instead of a baseband signal-processing panel 118. Accordingly, an interference canceler can be easily introduced.

Figure 6:
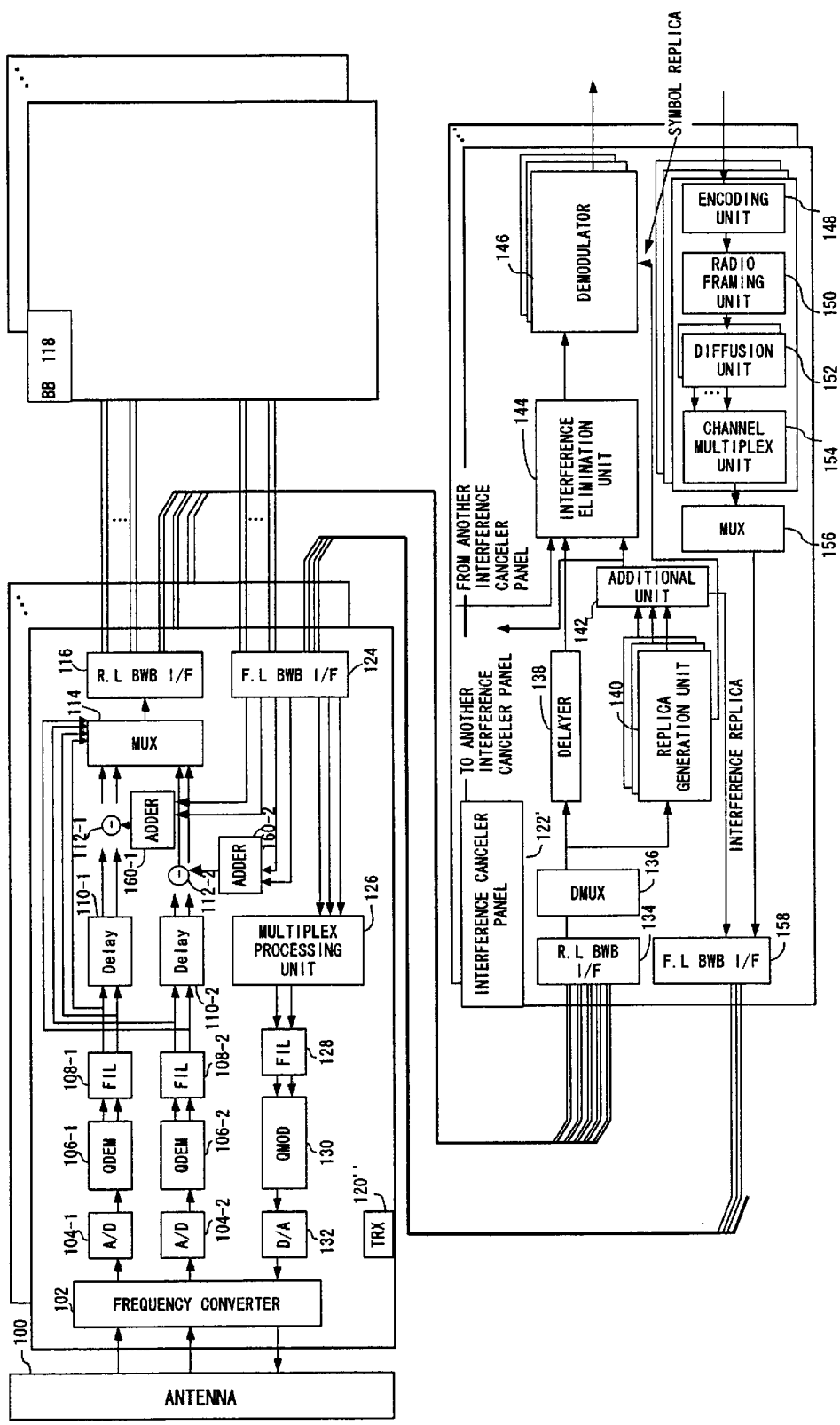
FIG. 6 shows the configuration of the second preferred embodiment of the present invention.

FIG. 6 shows the configuration of the second preferred embodiment of the present invention.

In FIG. 6, the same reference numbers are used for the same constituent components as those shown in FIG. 5.

An interference canceler panel 122' is basically the same as that of the first preferred embodiment. However, if a plurality of interference canceler panels 122' are installed, an inter-panel transmission line is added to that of the first preferred embodiment to transmit interference replica signal generated by each interference canceler panel to one another.

Since the flow of a receiving signal from the input of the signal to a transmitting/receiving panel 120' up to the transmission to the interference canceler panel 122' is the same as that of the first preferred embodiment, the description is omitted.

The interference canceler panel 122' receives a signal transmitted from the transmitting/receiving panel 120' through the up backboard signal interface 134, and the DMUX 136 demultiplexes the signal into I and Q signals for two branches. In this case, if the transmitting/receiving panel 120' does not multiplex the signal, there is no need for a DMUX 136. One pair of the demultiplexed receiving signals are transmitted to the delayer 138 and the other pair are transmitted to the replica generation unit 140. The replica generation unit 140 first inputs the receiving signal to a searcher, which is not shown in FIG. 6, and the searcher extracts the timing signal of the inputted delay wave. This timing signal is transmitted to the inverse diffusion unit, which is not shown in FIG. 6, of each finger and the inverse diffusion unit demodulates the receiving signal. After a channel estimation unit, which is not shown in FIG. 6, estimates of the channel of the demodulated signal, a combination unit, which is not shown in FIG. 6, combines signals for each finger at a maximum ratio and inputs the signal to a judgment unit, which is not shown in FIG. 6. After the judgment unit temporarily judges the receiving signal, the signal is branched again into a plurality of signals, a delay restoration unit, which is not shown in FIG. 6, restores the delay caused when the signal is inputted, using the timing signal extracted by the searcher and a re-diffusion unit, which is not shown in FIG. 6, restores the signal to the diffusion/modulation signal. The addition unit 142 combines the re-diffusion signals from the respective fingers into an interference replica signal. The output signal of the judgment unit of the replica generation unit 140 is transmitted to an interference replica generation unit in a subsequent stage or the demodulation unit 146 as a symbol replica signal. After the interference elimination unit 144 combines the combined interference replica signal with another interference replica signal transmitted from another interference canceler panel and eliminates interference components by subtracting the interference replica signal from the receiving signal that the delayer 138 delays by a process time required to generate an interference replica signal. In the interference canceler panel 122', the interference-eliminated receiving signal is transmitted to the demodulator 146, and the demodulator 146 demodulates the user data. After inversely diffusing the interference-eliminated receiving signal, the demodulator 146 combines the receiving signal with the symbol replica signal transmitted from the interference elimination unit 144, simultaneously detects the signal and performs RAKE-combination for the signal. After an error correction unit, which is not shown in FIG. 6, corrects the errors of the RAKE-combined signal, the RAKE-combined signal is outputted as receiving data. The output data have quite the same interface as that of the output of the conventional baseband signal-processing panel without an interference canceler.

The respective interference replica signals added by the addition unit 142 of each interference canceler panel 122' are transmitted again to the transmitting/receiving panel 120' through a down backboard signal interface 158. In the transmitting/receiving panel 120', after the addition units 160-1 and 160-2 combine the interference replica signals received from each interference canceler panel 122', and interference components are eliminated by subtracting the interference replica signal from the receiving signal that the delayers 110-1 and 110-2 delay by a time required to generate and to transmit the interference replica signal of the receiving signal. The interference-eliminated receiving signal is transmitted to the baseband signal processing unit 118 using the conventional backboard wiring, and the baseband signal processing unit 118 demodulates the interference-eliminated signal.

Since the flow of a transmitting signal is the same as that of the first preferred embodiment, the description is omitted.

According to the second preferred embodiment, if a plurality of interference canceler panels 122' are installed, a delay required to generate an interference replica signal and the like, becomes constant regardless of the number of the interference canceler panels 122' compared with a case where a plurality of interference replica signals are all processed only in each interference canceler 122'. Therefore, the circuit scale of the delayer of a transmitting/receiving panel can be reduced. Specifically, since all interference replica signals transmitted from each interference canceler panel 122' with a time lag are subtracted from the receiving signal, a delay amount given by the delayers 110-1 and 110-2 does not need to be complexly controlled. Since the conventional baseband signal processing panel 118 and the interference canceler panel 122' in the preferred embodiment of the present invention are almost equivalent except for that only the interference canceler panel 122' requires signal wires to transmit an interference replica signal, it is sufficient if the same number of signal wires to be installed to transmit interference replica signals as that of interference canceler panels 122', are provided. Therefore, there is almost no need to increase or modify the number of the wires of a backboard, regardless of whether the baseband signal processing panel 118 is provided with an interference canceler, and thereby an interference canceler can be easily introduced.

Figure 7:
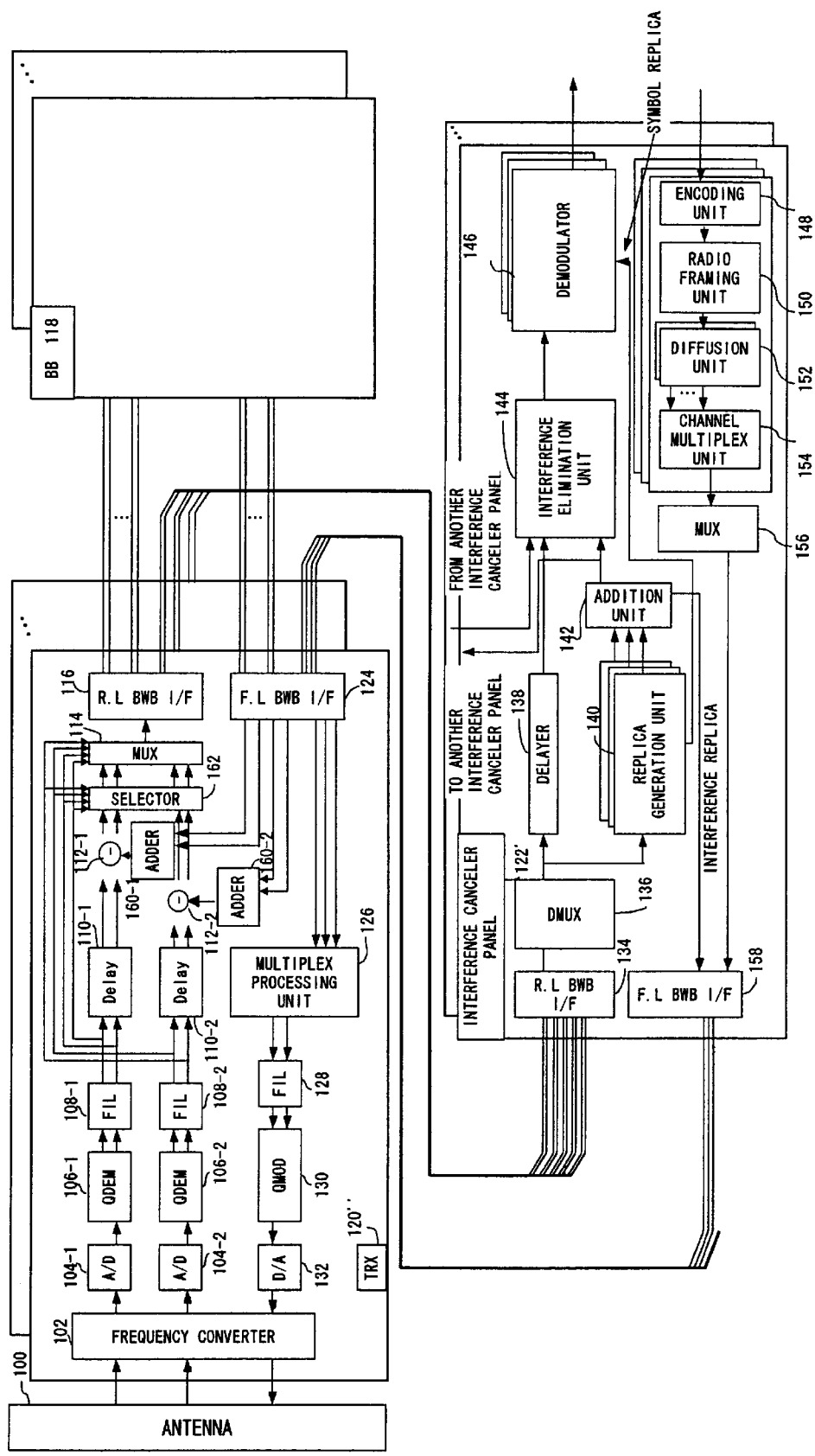
FIG. 7 shows the configuration of the third preferred embodiment of the present invention.

FIG. 7 shows the configuration of the third preferred embodiment of the present invention.

In FIG. 7, the same reference numbers are used for the same constituent components as those used in FIG. 6.

Figure 3:
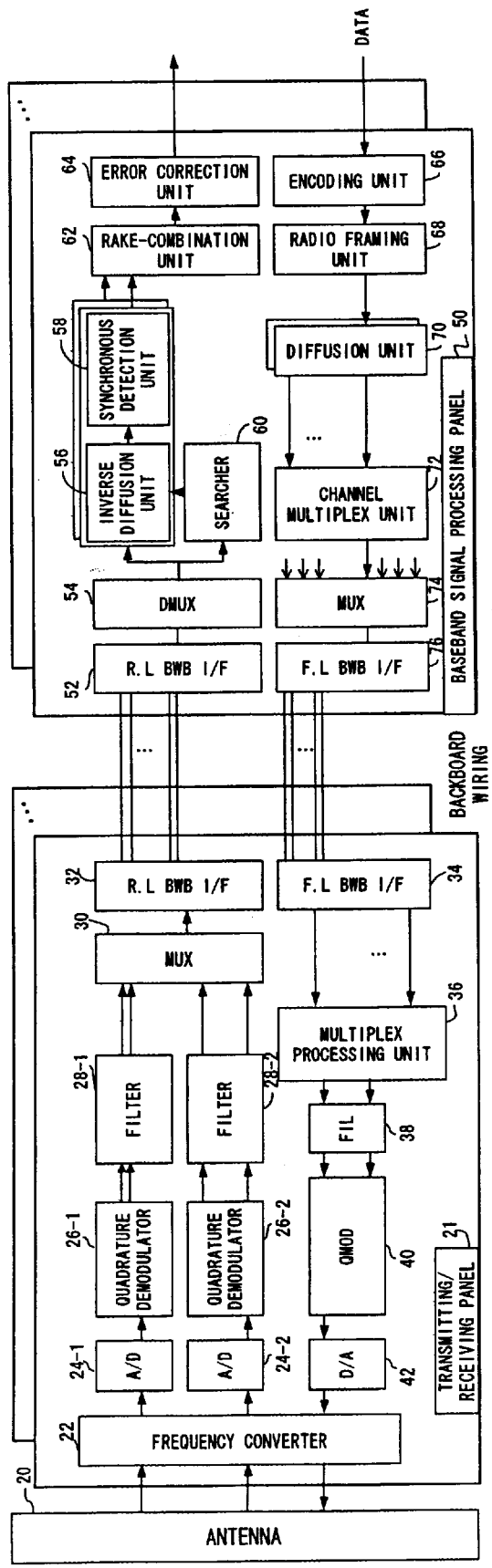
FIG. 3 shows the configuration in the case where no interference canceler is introduced into radio base-station equipment.
Figure 4:
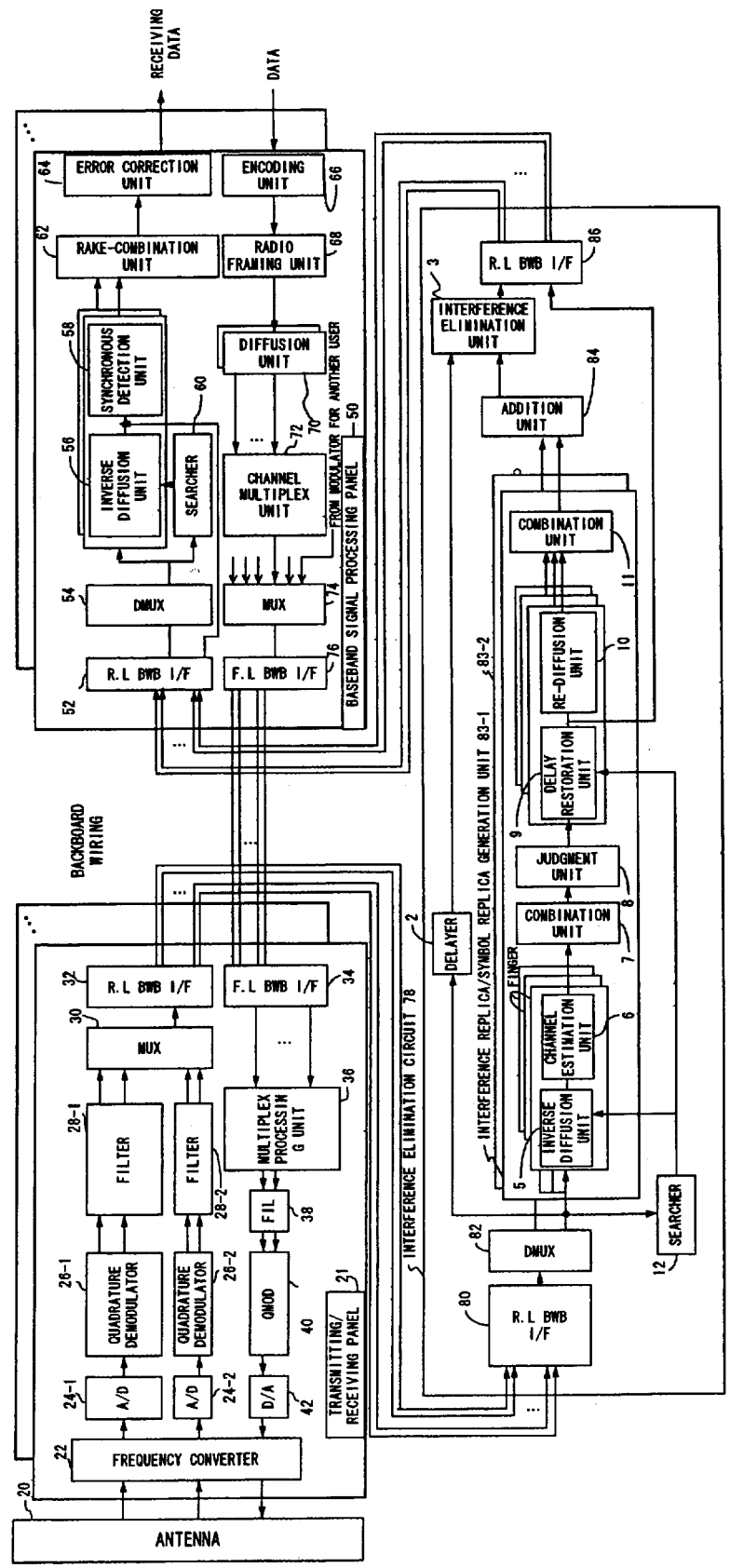
FIG. 4 shows the conventional configuration in the case where an interference canceler is installed in real radio base-station equipment.

The radio base-station equipment of this preferred embodiment largely comprises a transmitting/receiving panel 120' (TRX), an interference canceler panel 122' and a baseband signal processing panels 118 (BB). The receiving system of the transmitting/receiving panel 120' includes a frequency converter 102, A/D converters 104-1 and 104-2, quadrature demodulators 106-1 and 106-2 (QDEM), filters 108-1 and 108-2 (FIL), delayers 110-1 and 110-2 (Delay), interference elimination units 112-1 and 112-2 (divider units in FIG. 7), a selector 162 and an up backboard signal interface 116 (R.L. BWB I/F). The A/D converter 104, quadrature demodulator 106, filter 108, delayer 110 and interference elimination unit 112 are duplicated in relation to diversity reception (two systems or branches). The transmitting system of the transmitting/receiving panel 120' includes a down backboard signal interface 124 (F.L. BWB I/F), a multiplex processing unit 126, a filter 128 (FIL), a quadrature modulator 130 (QMOD), a D/A converter 132 and a frequency converter 102. Since the interference canceler panel 122' has the same configuration as that of the first or second preferred embodiment, the description is omitted. Since the baseband signal processing panel 118 (BB) is the same as that shown in FIG. 3, the description is also omitted.

The flow of a receiving signal is as follows. First, when an antenna 100 receives a signal, the frequency converter 102 of the transmitting/receiving panel 120'' converts the signal from an RF signal to a baseband frequency. Then, the A/D converters 104-1 and 104-2 convert the signal from an analog signal to a digital signal. The quadrature demodulators 106-1 and 106-2 quadrature-demodulate this digital signal, and the filters 108-1 and 108-2 restricts the band of the demodulated signal. Then, in the interference canceler panel 122', the signal is inputted to the MUX 114 without passing it through the delayers 110-1 and 110-2. A receiving signal used to eliminate interference components is inputted to the interference elimination units 112-1 and 112-2 (dividers in FIG. 7) through the delayers 110-1 and 110-2. Since the flow of the signal related to interference elimination is the same as that of the second preferred embodiment, the description is omitted. However, in this preferred embodiment, a selector is added. If an interference canceler panel 122' is provided and interference components are eliminated, the selector 162 transmits the interference-eliminated receiving signal to the MUX 114 after eliminating interference components. If an interference canceler panel 122' is not provided, the selector 162 selects receiving signals that do not pass through the delayers 110-1 and 110-2, and transmits them to the MUX 114. Then, the MUX 114 transmits them to the baseband signal-processing panel 118 through the conventional backboard wiring.

Since the flow of a transmitting signal is the same as that of the first preferred embodiment, the description is omitted.

According to the third preferred embodiment, when an interference canceler is not provided, a receiving signal can be demodulated without a unnecessary delay. Since the conventional baseband signal processing panel 118 and the interference canceler panel 122' in the preferred embodiment of the present invention are almost equivalent in input/output signal interface except for that only signal wires are required to transmit interference replica signals, it is sufficient if the same number of signal wires to be installed to transmit interference replica signals as that of interference canceler panels 122'. Therefore, an interference canceler can be easily introduced with almost no increase/modification of the number of the wires of a backboard, regardless of whether the baseband signal-processing panel 118 is provided with an interference canceler.

FIG. 8 shows the configuration of the fourth preferred embodiment of the present invention.

In FIG. 8, the same reference numbers are used for the same constituent components as those used in FIG. 7.

The radio base-station equipment of this preferred embodiment largely comprises a transmitting/receiving panel 120''' (TRX), an interference canceler panel 122' and a baseband signal processing panels 118 (BB). Since the receiving system of the transmitting/receiving panel 129''' is the same as that of the third preferred embodiment, the description is omitted.

Since the receiving system of the interference canceler panel 122' is the same as that of the second or third preferred embodiment, the description is omitted.

The transmitting system of the interference canceler panel 122' includes an encoding unit 148, a radio framing unit 150, a diffusion unit 152, a channel multiplex unit 154, a MUX 156, a multiplex processing unit 166 and a down backboard signal interface 158 (R.L. BWB I/F). The baseband signal processing unit 118 (BB) is the same as the baseband signal processing unit 50 shown in FIG. 3.

Since the flow of a receiving signal is the same as that of the third preferred embodiment, the description is omitted.

The multiplex processing unit 166 of the interference canceler panel 122' in the fourth preferred embodiment multiplexes the down signal (transmitting signal) of user data with an interference replica signal that is generated by the replica generation unit 140 and added by the addition unit 142, superimposes the down user data and interference replica signal on a backboard signal wire that conventionally transmits a down signal, and transmits them. The signals that are superimposed and transmitted to the transmitting/receiving panel 120''' are inputted to the DMUX 164 newly provided in the transmitting/receiving panel 120''' through the down backboard signal interface 124 of the transmitting/receiving panel 120'''. The DMUX 164 demultiplexes the down signal (transmitting signal) and interference replica signal, and transmits the interference replica signal and the down signal to the adders 112-1 and 112-2, and the multiplex processing unit 126, respectively.

According to the fourth preferred embodiment, the number of the input/output signal wires of the conventional baseband signal processing unit 118 and that of the interference canceler panel 122' in the fourth preferred embodiment of the present invention completely match. If the transmitting/receiving panel 120''' is designed according to the preferred embodiment of the present invention, an interference canceler can be introduced without any modification of a backboard wiring even if a baseband signal processing panel 118 is replaced with an interference canceler panel 122' when an interference canceler is introduced.

According to the present invention, in the transmitting/receiving equipment of a radio base station, a circuit without an interference canceler and a circuit with an interference canceler can be easily replaced. Even if interference components are eliminated for a part of users and are not eliminated for the other users, settings can be easily made.

What is claimed is:

1. Radio equipment adopting a code division multiple access method, comprising:

a transmitting/receiving panel receiving a signal from an antenna, performing a prescribed process for the receiving signal, outputting the receiving signal and simultaneously delaying the signal by a prescribed time;

a removable baseband signal processing panel inversely diffusing/demodulating the receiving signal transmitted from the transmitting/receiving panel and demodulating data; and a removable interference canceler panel generating an interference replica signal to be used to eliminate interference components included in the receiving signal, based on the signal received from the transmitting/receiving panel and returning the interference replica signal to the transmitting/receiving panel, wherein the transmitting/receiving panel eliminates interference components by subtracting the interference replica signal transmitted from the interference canceler panel from the delayed receiving signal, inputs the receiving signal after interference elimination to the baseband signal processing panel and enables the baseband signal processing panel to demodulate data based on the receiving signal after the interference elimination, and said transmitting/receiving panel is provided with a selector for switching a transmission system route of the receiving signal to said baseband signal processing panel in such a manner that the receiving signal is transmitted to said baseband signal processing panel without the delay even if said interference canceler panel is removed.

2. The equipment according to claim 1, wherein said interference canceler panel eliminates interference components of the receiving signal transmitted from said transmitting/receiving panel, generates a symbol replica signal, which is an inverse diffusion/demodulation result of a receiving signal for a specific channel and demodulates data of the specific channel.

3. The equipment according to claim 2, wherein if a plurality of said interference canceler panels are provided, each of the plurality of said interference canceler panels comprises a transmission line transmitting the interference replica signal to one another among said interference canceler panels, wherein after adding an interference replica signal transmitted through the transmission line, each of the plurality of said interference canceler panels eliminates interference components, demodulates a receiving signal for the specific channel and simultaneously transmits an interference replica signal obtained by the addition, to said transmitting/receiving panel, and said transmitting/receiving panel eliminates interference components of a receiving signal using a signal obtained by adding an interference replica signal transmitted from each of the plurality of said interference canceler panels and transmits the receiving signal without interference components to said baseband signal processing panel.

4. The equipment according to claim 1, wherein when transmitting the interference replica signal to said transmitting/receiving panel, said interference canceler panel multiplexes the interference replica signal with a signal to be transmitted from said antenna, and upon receipt of the signal, said transmitting/receiving panel demultiplexes the signal into the interference replica and the transmitting signal.

5. The equipment according to claim 4 wherein number of wires of an interface between said interference canceler panel and said transmitting/receiving panel, and number of wires of an interface between said baseband signal processing panel and said transmitting/receiving panel are the same.

6. A method for adopting a code division multiple access method in radio equipment, comprising the steps of:

receiving a signal from an antenna, performing a prescribed process for the received signal, outputting the received signal and simultaneously delaying the received signal by a prescribed time;

inversely diffusing/demodulating the received signal output in the receiving step and demodulating data;

generating an interference replica signal used to eliminate interference components included in the received signal, based on the signal received from the receiving step; and eliminating interference components by subtracting the interference replica signal from the delayed received signal, and input the received signal after interference elimination to the inversely diffusing/demodulating step thereby enabling demodulating data based on the received signal after the interference elimination, and wherein said receiving step further provides a selector for switching a transmission system route of the received signal output in the receiving step in such a manner that the received signal is transmitted to said inversely diffusing/demodulating step without the delay even if said generating step is not performed.

7. The method according to claim 6, further including a step of providing an interference canceler unit that eliminates interference components of the received signal transmitted from said receiving step using the interference replica signal, generates a symbol replica signal, which is an inverse diffusion/demodulation result of a received signal for a specific channel, and demodulates data of the specific channel.

8. The method according to claim 7, wherein if a plurality of said interference canceler units are provided, each of the plurality of said interference canceler unit including:

a transmission line transmitting the interference replica signal to one another among said interference canceler unit, wherein after adding an interference replica signal transmitted through the transmission line, each of the plurality of said interference canceler unit eliminates interference components, demodulates a received signal for the specific channel and simultaneously transmits an interference replica signal obtained by the addition, to said receiving step, and said receiving step eliminates interference components of a received signal using a signal obtained by adding interference replica signals transmitted from each of the plurality of said interference canceler unit and transmits the received signal without interference components to said inversely diffusing/demodulating step.

9. The method according to claim 6, wherein when transmitting the interference replica signal to said receiving step, multiplexing the interference replica signal with a signal to be transmitted from said antenna, and upon receipt of the signal, said receiving step further includes demultiplexing the signal into the interference replica and the transmitting signal.

10. The method according to claims 9, wherein a number of wires for transmitting signals between said generating step and said receiving step, and a number of wires for transmitting signals between said inversely diffusing/demodulating step and said receiving step are the same.

* * * * *